(No Model.) 2 Sheets—Sheet 2.

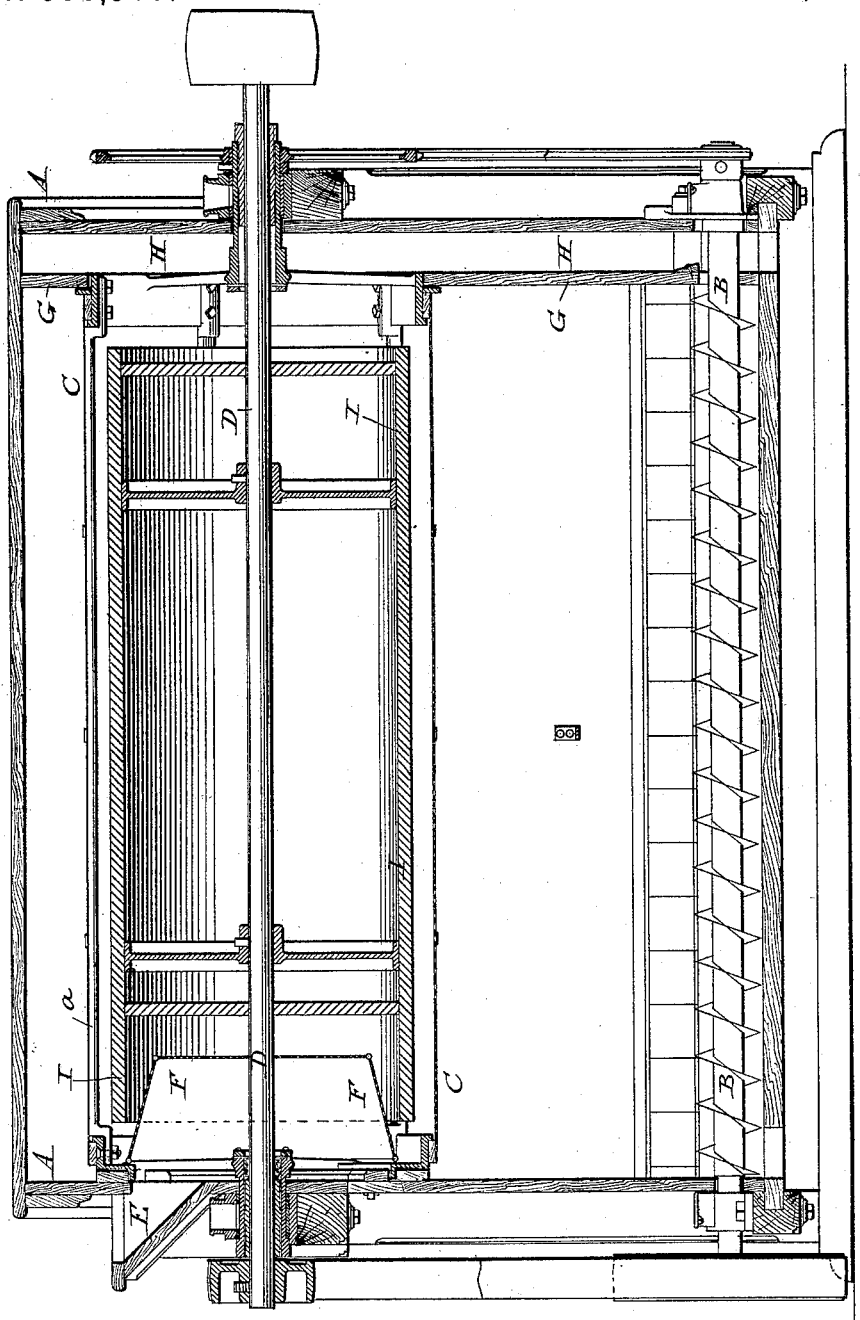

J. M. FINCH & W. D. GRAY.
ROTARY BOLT.

No. 398,388. Patented Feb. 26, 1889.

WITNESSES
Sidney P. Hollingsworth
W. R. Kennedy

John M. Finch
William D. Gray
By P. T. Dodge.
Attorney

UNITED STATES PATENT OFFICE.

JOHN M. FINCH AND WILLIAM D. GRAY, OF MILWAUKEE, WISCONSIN, ASSIGNORS TO EDWARD P. ALLIS & COMPANY, OF SAME PLACE.

ROTARY BOLT.

SPECIFICATION forming part of Letters Patent No. 398,388, dated February 26, 1889.

Application filed June 3, 1887. Serial No. 240,155. (No model.)

*To all whom it may concern:*

Be it known that we, JOHN M. FINCH and WILLIAM D. GRAY, of Milwaukee, in the county of Milwaukee and State of Wisconsin, have invented certain Improvements in Centrifugal Reels, of which the following is a specification.

This invention relates to that class of bolting or dressing machines in which the rotary cylindrical reel is arranged horizontally within a suitable casing; and it consists in the combination of the external reel, an internal cylinder or drum extending forward from end to end, and a screen located at the head of the reel and extended within the drum, as and for the purpose hereinafter described.

Figure 5:
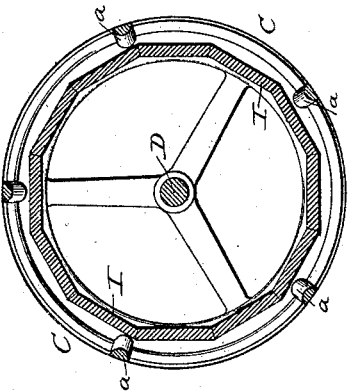
Figure 2:
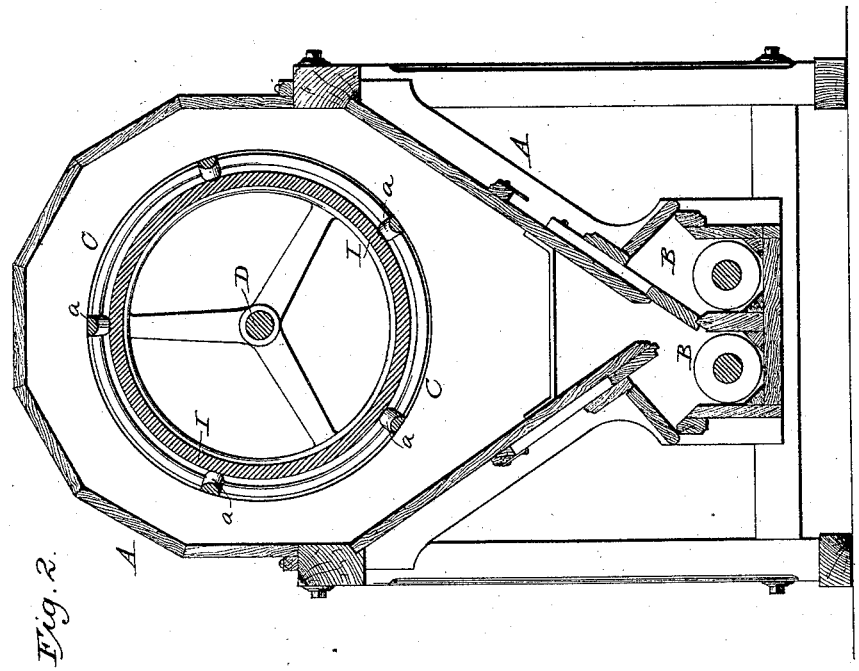

In the accompanying drawings, Figure 1 represents a longitudinal vertical section of a machine containing our improvements. Fig. 2 is a vertical cross-section of the same. Fig. 3 is a cross-section showing the internal drum of polygonal instead of circular form in cross-section.

Referring to the drawings, A represents the external frame or casing, which may be made of any appropriate form adapted to inclose the reel, its side walls being commonly deflected inward toward each other, as usual, to deliver the bolted material to the ordinary conveyers, B B, at the base.

C represents the cylindrical reel mounted longitudinally within the casing in a horizontal or substantially horizontal position and sustained by a longitudinal driving-shaft, D, seated in suitable bearings. The reel is clothed with bolting-cloth or other pervious material and is of cylindrical form in cross-section, the cloth being sustained in part by longitudinal internal ribs, *a*, attached at their ends to rings or heads.

At the head the machine is provided, as usual, with a feed-hopper, E, delivering the material into a conical screen, F, through which the fine material passes into the interior of the reel, while the dough-balls and coarse matters are discharged at the head, as in existing machines. At the tail end the reel is carried closely through a vertical partition, G, into a vertical chamber, H, which receives the tailings therefrom.

In applying our improvements to the machine we mount within the reel the cylinder I, having a diameter somewhat less than the interior of the reel. This drum may be made of wood, sheet metal, or other material and carried by the shaft of the reel. We prefer to close its two ends by heads secured therein, as shown, the head at the receiving end of the machine being set backward within the end of the drum, which is extended forward around the outside of the conical screen F. This construction admits of the cylinder being extended the full length of the reel, so as to render the surface of the latter fully available without elongating the machine to admit the conical screen. The reel and the conical screen revolve with the shaft and drum.

The material entering the reel passes into the annular space between the bolting-cloth and the surface of the cylinder, which acts to confine it in contact with the bolting-surface. In practice we find that the material thus confined has a tendency to rise to a certain extent on the ascending side of the reel and to roll downward over the bolting-surface, thus increasing the efficiency of the machine.

The details of construction may be modified at will.

We are aware that a polygonal reel has been provided with an internal drum having three longitudinal "ribs" or "buckets" adapted to receive material elevated by one side of the reel and deliver it to the opposite side of the reel, and to such construction we lay no claim, an essential feature of the present construction residing in the formation of the drum with a smooth as distinguished from a ribbed surface. When constructed with the smooth surface and arranged in close proximity to the inner surface of the reel, the drum serves to confine between its outer surface and the inner surface of the reel a thin sheet or stratum of material, which flows constantly and uninterruptedly downward on the ascending bolting-surface, our drum being incapable of lifting the material over its center.

Having thus described our invention, what we claim is—

In a centrifugal reel, the combination of the outer reel, the inner cylinder having a smooth surface and a recessed head, and the conical screen F, extended into the end of the cylinder, as described.

In testimony whereof we hereunto set our hands, this 9th day of September, 1886, in the presence of two attesting witnesses.

JOHN M. FINCH.
WILLIAM D. GRAY.

Witnesses:
JOHN I. MARSHALL,
THEO F. WAMBOLD.